United States Patent

[11] 3,608,033

| [72] | Inventor | Norman T. Hall<br>Phoenixville, Pa. |
| --- | --- | --- |
| [21] | Appl. No. | 833,983 |
| [22] | Filed | June 14, 1969 |
| [45] | Patented | Sept. 21, 1971 |
| [73] | Assignee | Liquid Nitrogen Processing Corporation<br>Malvern, Pa. |

[54] PROCESS FOR PRODUCTION OF MOLDING COMPOSITIONS CONTAINING HIGH WEIGHT PERCENTAGE OF GLASS
3 Claims, 4 Drawing Figs.

[52] U.S. Cl. ............................................... 264/141,
264/149, 264/174, 260/41, 161/174, 161/175
[51] Int. Cl. ............................................... B29c 17/14
[50] Field of Search ............................................... 264/140–143,
149, 174; 260/41 AG; 161/174, 175

[56] References Cited
UNITED STATES PATENTS

| 2,741,294 | 4/1956 | Pancherz | 264/149 UX |
| --- | --- | --- | --- |
| 2,877,501 | 3/1959 | Bradt | 264/143 |
| 2,948,649 | 8/1960 | Pancherz | 264/149 X |
| 3,022,210 | 2/1962 | Philipps | 264/174 X |
| 3,158,519 | 11/1964 | Shannon et al. | 260/41(A6) X |
| 3,164,563 | 1/1965 | Maxwell et al. | 264/143 X |
| 3,304,282 | 2/1967 | Cadus et al. | 264/174 X |
| 3,377,233 | 4/1968 | Jackson | 264/174 |
| 3,509,247 | 4/1970 | Perrone et al. | 264/143 X |

FOREIGN PATENTS

| 1,060,186 | 3/1967 | Great Britain | 264/143 |
| --- | --- | --- | --- |
| 1,440,582 | 4/1966 | France | 264/174 |

OTHER REFERENCES

W. R. Schlich et al.; " Critical Parameters for Direct Injection Molding of Glass-Fiber-Thermoplastic Powder Blends;" SPE Journal, February 1968, Vol. 24, pp. 43– 53. Copy in Class 260/41 AG.

Primary Examiner—Robert F. White
Assistant Examiner—T. J. Carvis
Attorney—Seidel, Gonda & Goldhammer ABSTRACT: Process for production of molding compositions containing high weight percentage of glass comprising feeding an extruded mixture of glass fibers and molten thermoplastic resin to a crosshead die, coating continuous glass roving with said mixture in said crosshead die, solidifying said molten thermoplastic while said thermoplastic is coated on said roving, and pelletizing the same into pellets containing between about 61 to 90 weight percent glass. The molding composition is in the form of such pellets which generally comprise right cylinders having a diameter of between three thirty-seconds and one-fourth inch and a height of between one-eighth to one-half inch.

PATENTED SEP 21 1971  3,608,033
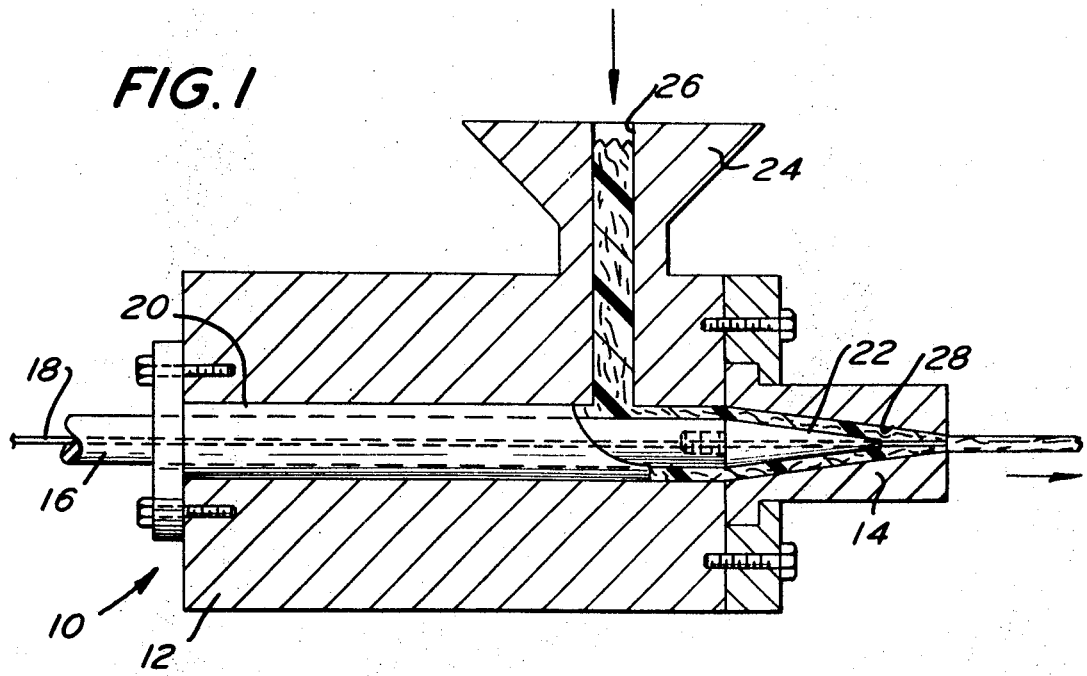
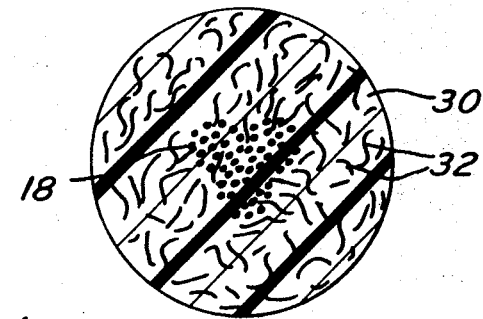
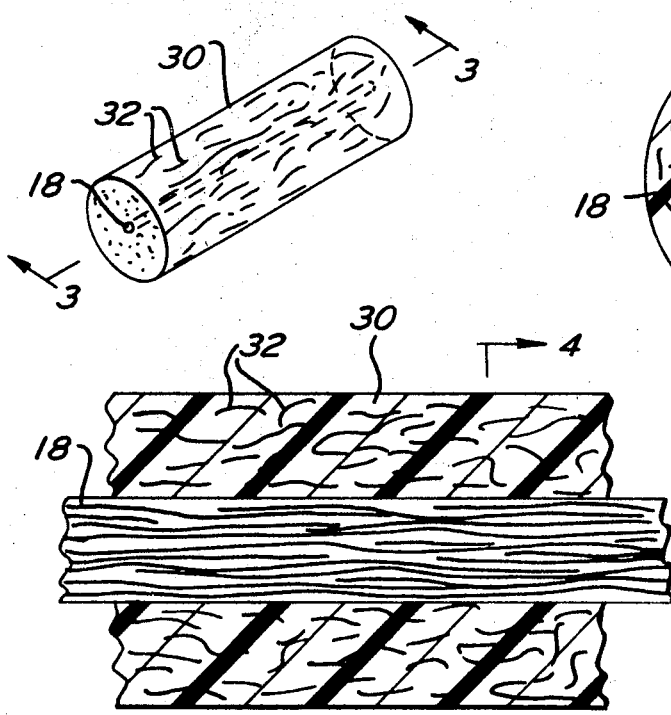
INVENTOR
NORMAN T. HALL
BY
Seidel, Gonda & Goldhammer
ATTORNEYS.

PROCESS FOR PRODUCTION OF MOLDING COMPOSITIONS CONTAINING HIGH WEIGHT PERCENTAGE OF GLASS

The present invention is directed to a process for the production of molding compositions containing a high weight percentage of glass, and in particular molding compositions containing in excess of about 60 weight percent of glass, such as between 61 to 90 weight percent of glass.

Glass reinforced thermoplastic injection molding compound has achieved widespread adoption. Conventionally, such material is sold in the form of cylinder pellets containing glass fibers and/or roving disposed therein.

There has been a long-felt need for suitable glass-reinforced thermoplastic injection molding pellets containing a high weight percentage of glass. Thus, it is most desirable from a cost standpoint for the molder making the glass-reinforced article to be able to blend thermoplastic with glass-reinforced thermoplastic material so as to achieve the desired weight percentage of glass in the molded article. Thus, it is significantly cheaper to blend four pellets of thermoplastic with a single pellet of glass-reinforced thermoplastic (with each of the pellets being of the same size), said glass-reinforced thermoplastic containing 80 weight percent glass, to yield a molded article containing 16 weight percent glass, then it is to use five pellets, each of which contains 16 weight percent glass. The use of a single pellet containing 80 weight percent glass means that only one pellet out of five used by the molder need be glass-reinforced. Since there is a significant processing charge to forming glass-reinforced pellets, this charge is substantially reduced when the number of glass-reinforced pellets used by the molder is substantially reduced. However, problems have been encountered in the usage of extruded thermoplastic injection molding pellets derived from roving (by "roving" is meant a plurality of glass fibers joined together in a strand), which pellets contain very high concentrations of glass, such as of the order of 61 to 90 weight percent with thermoplastic pellets in injection molding. The usage of such pellets together with thermoplastic pellets results in "fuzz-balling" from the breakup of the continuous roving during the initial mixing prior to injection molding. Such fuzz-balling results in an increase in the bulk density of the product, and makes the product difficult to handle.

Another approach that has resulted in an interior product has been to coat a continuous roving of glass with a solution of the thermoplastic, and then to volatilize the solvent from the solution to yield a thin coating of the thermoplastic on the roving. The resulting material has not been altogether satisfactory because the extreme thinness of the thermoplastic coating renders it subject to breakage, peeling, and other mechanical destruction.

This invention has as an object the provision of a process for the production of molding compositions containing a high weight percentage of glass such as about 61 to 90 weight percent glass.

This invention has as another object the provision of a process for the production of molding compositions containing a high weight percentage of glass, which can be tumbled or otherwise mechanically blended by agitation with thermoplastic particles, with the resulting blend being used to mold a glass-reinforced article.

This invention has as yet another object the provision of glass-reinforced thermoplastic injection molding pellets containing a high weight percentage of glass.

Other objects will appear hereinafter.

These and other objects are accomplished by the process of my invention in which an extruded mixture of glass fibers and molten thermoplastic resin is fed to a crosshead die. A continuous glass roving is introduced through the crosshead die and coated with said mixture of glass fibers and molten thermoplastic. The so-coated roving is removed from the crosshead die, with the thermoplastic being solidified by cooling, and the product then cut into pellets, such as right cylinders having a diameter of between three thirty-seconds inch and one-fourth inch, and a height of one-eighth inch to one-half inch.

The glass-reinforced molding compositions of the present invention comprise right cylinders having a diameter of between three thirty-seconds inch to one-fourth inch and a height of one-eighth inch to one-half inch. Such cylinders have a longitudinal axial core of continuous glass roving coated with a mixture of glass fibers and thermoplastic and containing from about 61 to 90 weight percent of glass.

For the purpose of illustrating the invention, there is shown in the drawings a form which is presently preferred; it being understood, however, that this invention is not limited to the precise arrangements and instrumentalities shown.

Referring to the drawings wherein like reference characters refer to like parts:

FIG. 1 is a longitudinal sectional view of a crosshead die used in conjunction with the process of the present invention.

FIG. 2 is a perspective view of a glass-reinforced thermoplastic injection molding pellet of the present invention.

FIG. 3 is a longitudinal sectional view of the product from the crosshead die shown in FIG. 1, after such product has left the forming die, taken on line 3—3, of FIG. 2.

FIG. 4 is a cross-sectional view taken on line 4—4 on FIG. 3.

Referring to the drawings, and initially to FIG. 1:

The crosshead die is designated generally as 10. It includes a die body 12 and a forming die 14. A mandrel 16 is disposed within the bore of the body 12 and the forming die 14. The mandrel 16 is provided with a bore through which the continuous roving 18 extends. Such continuous roving 18 may be fed from a feeder roll (not shown) or other source. The mandrel 16 includes a deflector sleeve 20 and a tip 22 source, with the tip 22 extending within the bore of the forming die portion 14 of the crosshead die 10.

The die body 12 includes an inlet 24 which is in communication with the discharge of an extruder (not shown). The extruder discharges molten thermoplastic containing dispersed glass fibers into the bore 26 of the inlet 24 of die body 12. The die body 12 may include heating means (not shown) for maintaining the thermoplastic in the molten state. However, in many cases, the thermoplastic will have been heated to such a degree that it will remain molten within the crosshead die without the need for heating means and the crosshead die.

The bore 26 is in communication with the bore 28 within which the mandrel 16 and its tip 22 are disposed.

The deflector sleeve 20 of the mandrel 16 prevents molten thermoplastic and glass fibers from entering the posterior portion of the die body 12 (shown in the left portion of FIG. 1).

The continuous roving 18 is guided within the bore of the mandrel 16 and emerges from the tip 22 of the mandrel 16 into the bore 28 of the forming die 14.

Within the bore 28 such continuous roving from the tip 22 becomes coated with the molten thermoplastic containing dispersed glass fibers and the so-coated roving is removed from the forming die 14. This removal may be accomplished by a take-up roll (not shown) or by pinch roll means, such as pinch roll means (not shown) associated with a chopper which cuts the so-coated continuous roving into right cylinders of the desired length. The feed roll, take-up roll, chopper, and pinch roll means are conventional equipment presently used in conjunction with the manufacture of cylinders of thermoplastic injection molding polymers.

FIG. 3 is a longitudinal section showing the coated continuous roving as the same exists when it leaves the forming die 14.

The continuous roving 18 may be formed from one or more strands of continuous roving. Preferably, the continuous roving should have a length of between about 400 to 4000 yards per pound of roving. The roving should be Type E glass, preferably in diameters running from 0.0002 to 0.0006 inches. Normally, either G glass fibers having a diameter of 0.00037 inches or K fibers having a diameter of 0.00051 inches may be used.

A wide variety of suitable sizings are available, and the selection of a sizing forms no part of the present invention. The sizings vary depending upon the specific thermoplastic that is used. By way of example, a suitable commercial sizing may be a three component system and include a silane, such as aminosilane or a epoxysilane as a chemical bonding agent; a lubricant to prevent chafing (namely to prevent the degradation of glass fibers by mechanical contact with each other); and a cementitious material such as polyvinyl alcohol or other commercial water-soluble film former.

As seen in FIGS. 3 and 4, the continuous roving 18 is surrounded by a coating of the thermoplastic polymer 30 containing dispersed glass fibers 32.

The solidification of the molten thermoplastic portion 30 of the coating for the continuous roving 18 is readily accomplished by cooling in air after the same has left the forming die 14.

As seen particularly in FIG. 4, the thermoplastic portion 30 occupies the voids and spaces about the continuous roving 18. The glass fibers 32 in the thermoplastic 30 are dispersed substantially randomly in the coating.

The feed to the extruder in advance of the crosshead die may include either a mixture of glass fibers (such as chopped rovings) and thermoplastic pellets, or thermoplastic pellets containing dispersed glass fibers therewithin.

Since the combined polymer dispersed glass coating, which embraces the roving, is stiff and harder than conventional polymer coatings, the pellets containing a high percentage of glass do not break apart upon tumbling to produce fuzz balls. Moreover, the glass fibers dispersed within the thermoplastic coating are not subject to fuzz-balling.

FIG. 2 reveals a perspective view of a pellet of the present invention. As seen in FIG. 2, such pellet is a right cylinder. The right cylinder should have a diameter of between three thirty-seconds inch to one-fourth inch and a height of one-eighth inch to one-half inch. Such size pellets may be satisfactorily handled in commercial molding equipment.

As heretofore indicated, a plurality of continuous rovings may be used as the core. In the illustrated embodiment, three such rovings are utilized.

The subject invention is applicable to all thermoplastics which may be used to manufacture glass-reinforced injection molded articles. By way of example, the same include the nylon polyamides, such as nylon 6, nylon 11, nylon 610, nylon 66, etc., polystyrene and copolymers thereof such as styrene-acrylonitrile and ABS: polyolefins such as polyethylene, polypropylene, and polyisobutylene; polyarylates such as polycarbonates, polysulfones and polyphenylene oxide; acetals, polyurethanes, and polyvinylchloride.

By way of example, and not by way of limitation, the following examples serve to illustrate the subject invention:

EXAMPLE 1

Glass fortified polystyrene pellets containing 20 weight percent dispersed glass fibers designated CF–1004, whose physical properties are detailed in Liquid Nitrogen Processing Corporation Product Data Bulletin 2080-1067 were extruded through a 2-inch Royle extruder into the crosshead shown in FIG. 1 onto continuous roving, designated PPG 539. Such continuous roving was formed of K fiber and was fed as two strands through a 0.125 inch die which resulted in a strand weighing 2.74 grams per foot running at 500 feet per minute. The resultant product contained 61 weight percent glass. During the run, the extruder was operated at a barrel temperature of between 500° to 550° F., and heaters were maintained in the crosshead die so that such die was at a similar temperature. The extruder was operated at eight revolutions per minute.

EXAMPLE 2

The process of Example 1 may be repeated, but with polystyrene pellets and chopped roving (PPG 539) being fed to the extruder.

EXAMPLE 3

SAN resin containing 30 percent uniformly dispersed glass fibers were extruded using the crosshead die over 22 strands of continuous K fiber glass roving weighing 0.094 grams per foot. The result was a product containing 2.20 grams of continuous glass strands, 0.38 grams glass fibers dispersed in 0.88 grams of SAN resin.

EXAMPLE 4

A type 6 nylon resin containing 40 percent uniformly dispersed glass fibers suitably treated for reinforcing nylon were extruded over 30 strands of continuous glass fiber moving weighing 0.089 grams per foot. The product weighed 3.95 grams per foot so that the product contained 0.77 grams of type 6 nylon, 1.51 grams of uniformly dispersed glass fibers and 2.67 grams of chopped continuous glass roving

EXAMPLE 5

An 8–10 melt index polypropylene homopolymer containing 30 percent glass fibers treated so as to interact with the polypropylene were extruded convergent with glass fibers (suitably treated for compatibility with polypropylene) weighing 0.045 grams per linear foot. Forty-eight continuous roving strands were used so that the total product weight was 3.08 grams per foot. The resin/dispersed glass coating weighed 0.92 grams per foot and contained 0.28 grams uniformly dispersed glass fiber per foot. The total glass fiber content was 79 percent.

The present invention may be embodied in other specific forms without departing from the spirit or essential attributes thereof.

I claim:

1. In a process for production of glass-reinforced injection molding material the steps comprising extruding a mixture of a dispersion of glass fibers and molten thermoplastic onto continuous glass roving, whereby said continuous glass roving is coated with said mixture, solidfying said thermoplastic while said thermoplastic is coated on said roving, and pelletizing the same into pellets containing between about 61 to 90 weight percent of glass.

2. A process in accordance with claim 1 wherein the pelletizing step involves chopping the coated roving to yield right cylinders having a diameter of three thirty-seconds inch to one-fourth inch and a height of one-eighth inch to one-half inch.

3. A process is accordance with claim 2 in which the extruded mixture is coated onto the continuous glass roving in a crosshead die.